US011045048B2

(12) United States Patent
Diekmann et al.

(10) Patent No.: US 11,045,048 B2
(45) Date of Patent: Jun. 29, 2021

(54) APPARATUS, SYSTEM, AND METHOD FOR COOKING FOOD

(71) Applicant: Dalsin Industries, Inc., Bloomington, MN (US)

(72) Inventors: Keith Sylvan Diekmann, Apple Valley, MN (US); Joseph John Hoffman, Waverly, MN (US)

(73) Assignee: Daisin Industries, inc., Bloomington, MN (US)

( * ) Notice: Subject to any disclaimer, the term of this patent is extended or adjusted under 35 U.S.C. 154(b) by 9 days.

(21) Appl. No.: 16/407,534

(22) Filed: May 9, 2019

(65) Prior Publication Data
US 2020/0352394 A1 Nov. 12, 2020

(51) Int. Cl.
*A47J 37/07* (2006.01)
*A47J 37/04* (2006.01)
*A47J 37/06* (2006.01)

(52) U.S. Cl.
CPC ............ *A47J 37/07* (2013.01); *A47J 37/04* (2013.01); *A47J 37/0641* (2013.01); *A47J 37/0647* (2013.01)

(58) Field of Classification Search
CPC ......... A47J 37/0704; A47J 33/00; F24C 1/16; F24B 1/02
See application file for complete search history.

(56) References Cited

U.S. PATENT DOCUMENTS

| 5,331,943 A | * | 7/1994 | Ko | F24B 1/024 |
| | | | | 110/267 |
| 5,429,110 A | * | 7/1995 | Burke | A47J 37/0704 |
| | | | | 110/110 |
| 6,223,737 B1 | | 5/2001 | Buckner | |
| 2003/0194671 A1 | * | 10/2003 | Webb | A47J 37/0704 |
| | | | | 431/159 |

(Continued)

FOREIGN PATENT DOCUMENTS

| DE | 3128298 A1 * | 4/1983 | ............... F24C 1/16 |
| WO | WO-2020227522 A1 | 11/2020 | |

OTHER PUBLICATIONS

"International U.S. Appl. No. PCT/US2020/031862, International Search Report dated Sep. 22, 2020", 6 pgs.

(Continued)

*Primary Examiner* — Jason Lau
(74) *Attorney, Agent, or Firm* — Schwegman Lundberg & Woessner, P.A.

(57) ABSTRACT

A system for cooking food, can include a control circuit that operates a fuel feeder, for instance to vary a rate of fuel discharged from the fuel feeder. The control circuit can operate a fan, for instance to vary the speed of the fan. The control circuit can receive one or more signals from the fan that correspond to an amount of fuel discharged from the fuel feeder. The control circuit can receive one or more signals from the fuel feeder that correspond to an amount of air displaced by the fan. The system can monitor a temperature of a cooking area and can adjust the amount of fuel (Continued)

discharged from a fuel feeder, for instance to vary the temperature in the cooking area. The system can adjust the speed of the fan to establish a desired air-to-fuel ratio for combustion in a combustion chamber.

20 Claims, 10 Drawing Sheets

(56) References Cited

U.S. PATENT DOCUMENTS

| | | | | |
|---|---|---|---|---|
| 2007/0130830 | A1* | 6/2007 | Varatharajan | C01B 3/363 48/127.9 |
| 2011/0212404 | A1* | 9/2011 | Fan | F23N 1/082 431/12 |
| 2014/0238378 | A1* | 8/2014 | Scott | F24B 1/181 126/55 |
| 2015/0081086 | A1* | 3/2015 | Hallowell | F23N 5/022 700/209 |
| 2017/0215641 | A1* | 8/2017 | DeBruler | A47J 37/0704 |
| 2019/0008321 | A1 | 1/2019 | Allmendinger | |
| 2019/0327795 | A1* | 10/2019 | Hannah | A23L 5/15 |

OTHER PUBLICATIONS

"International U.S. Appl. No. PCT/US2020/031862, Invitation to Pay Additional Fees dated Jul. 29, 2020", 10 pgs.

"International U.S. Appl. No. PCT/US2020/031862, Written Opinion dated Sep. 22, 2020", 9 pgs.

* cited by examiner

APPARATUS, SYSTEM, AND METHOD FOR COOKING FOOD

TECHNICAL FIELD

This document pertains generally, but not by way of limitation, to a cooking apparatus (e.g., a grill, smoker, stove, or the like) and a system or method for controlling the cooking apparatus.

BACKGROUND

Food products can be prepared with one or more cooking operations. For example, a food product (e.g., a cut of meat, vegetable, fruit, bread, or the like) can be cooked on a grill. The food product can be smoked, and smoking the food product can cook the food. The flavor added to the food product during the cooking operation can vary depending upon the fuel source (e.g., charcoal, propane, wood pellets, or the like) used to cook the food.

SUMMARY

The present inventors have recognized, among other things, that a problem to be solved can include obtaining a desired flavor profile (e.g., taste, consistency, or the like) for a food product. The present inventors have recognized, among other things, that a problem to be solved can include reducing the occurrence of white smoke during a cooking operation. The presence of white smoke during the cooking operation can provide an unpalatable flavor profile to a food product. The present inventors have recognized, among other things, that a problem to be solved can include controlling the air-to-fuel ratio during combustion of a fuel source (e.g., charcoal, propane, wood pellets, or the like) during a cooking operation. The present inventors have recognized, among other things, that a problem to be solved can include improving the efficiency of the combustion process during a cooking operation.

The present subject matter can help provide a solution to the aforementioned problems, such as by providing an apparatus for cooking a food product. The apparatus can include a combustion chamber, and the combustion chamber can be configured to burn one or more fuel sources. The combustion chamber can include a burn pot defined by a side wall and a bottom wall. The bottom wall can be coupled to the side wall. A first air intake can extend through the bottom wall. A second air intake can extend through the side wall. An air box can be coupled to the combustion chamber. The air box can define an air chamber. The air chamber can be in communication with the first air intake and the second air intake.

The present subject matter can help provide a solution to the aforementioned problems, such as by providing a system for cooking food. The system can include a control circuit. The control circuit can be configured to transmit a first control signal that can be configured to operate a fuel feeder. The first control signal can vary a rate of fuel discharged from the fuel feeder. The control circuit can be configured to receive a second control signal that can be indicative of the amount of fuel discharged from the fuel feeder. The control circuit can be configured to transmit a third control signal that can be configured to operate a fan. The third control signal can vary the speed of the fan. The control circuit can be configured to receive a fourth control signal that can be indicative of the amount of air displaced by the fan.

At least one of the apparatus or the system can improve the efficiency of the combustion process during the cooking operation. For instance, air can be introduced into the first air intake and a fuel source (including, but not limited to solid wood pellets, or the like) can be combusted in the burn pot, for example in a primary combustion process. The combustion of the fuel source and the air can produce an exhaust. The second air intake can introduce additional air into the burn pot proximate to the exhaust located in the burn pot. The air introduced by the second air intake can mix with the exhaust, and a secondary combustion process e.g., reaction, burn, oxidation) can occur within (or proximate to) the burn pot. The secondary combustion process can produce additional heat (in comparison to a primary combustion process alone). The secondary combustion process can combust a portion of the exhaust of the primary combustion process. The combustion of the exhaust can improve the efficiency of the combustion of the fuel, for example by combusting portions of the fuel that would otherwise be exhausted to the environment. Accordingly, the apparatus or the system can help decrease the amount of fuel needed to generate a desired temperature within a cooking area, and can help decrease the amount of fuel needed to cook a food product.

At least one of the apparatus or the system can control the air-to-fuel ratio during a combustion process. For example, the air-to-fuel ratio of a combustion process can be the ratio of the amount of air displaced by a fan compared to the amount of fuel discharged from fuel feeder. The air-to-fuel ratio within the burn pot can be controlled by the control circuit. In some examples, the control circuit can modulate the first control signal or the third control signal to adjust the air-to-fuel ratio. For instance, the amount of fuel discharged from the fuel feeder, or the amount of air displaced by the fan can vary the air-to-fuel ratio. The control circuit can maintain the air-to-fuel ratio within an air-to-fuel threshold.

Adjusting the air-to-fuel ratio can vary the type of smoke generated by the combustion process (or processes, such as a primary and secondary combustion process). For example, maintaining the air-to-fuel ratio can provide a blue smoke during a combustion process. Blue smoke can provide a palatable flavor profile to a food product that undergoes a cooking operation. White smoke can provide an unpalatable flavor profile to the food product. Accordingly, the apparatus or the system can help improve the flavor profile of the food product, including (but not limited to) by adjusting (or maintaining) the air-to-fuel ratio of a combustion process within the burn pot.

This overview is intended to provide an overview of subject matter of the present patent application. This overview is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Eke numerals having different letter suffixes may represent different instances of similar components. The drawings illustrate generally, by way of example, but not by way of limitation, various embodiments discussed in the present document.

DETAILED DESCRIPTION

Figure 1:
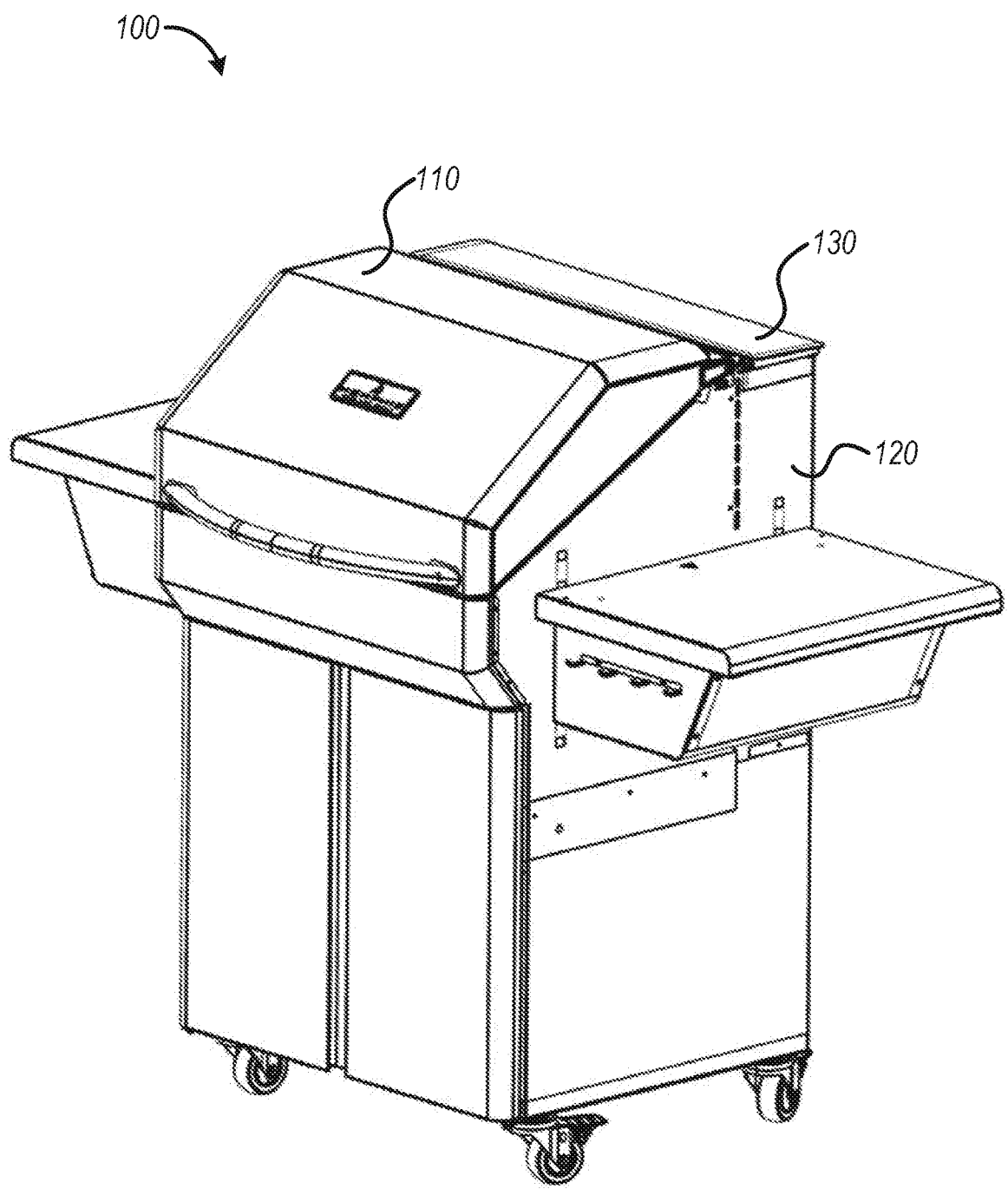
FIG. 1 is an isometric view of an example of a cooking apparatus.

FIG. 1 is a perspective view of an example of a cooking apparatus 100. The apparatus 100 can be configured as a grill, smoker, or the like. The apparatus 100 can include a hood 110 that can be moveably coupled with a frame 120 of the apparatus 100. As described in greater detail herein, the frame 120 can support one or more components of the apparatus 100. The apparatus 100 can include a lid 130, and the lid 130 can provide access to a fuel reservoir.

Figure 2:
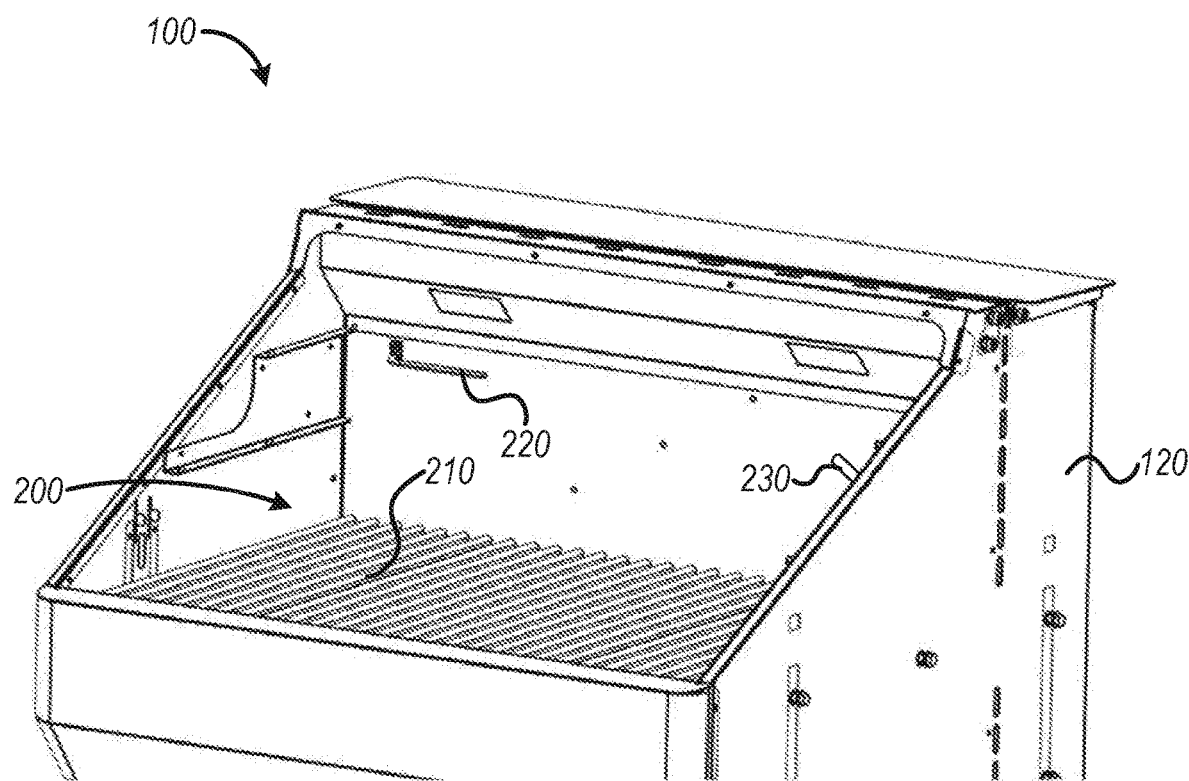
FIG. 2 is an isometric view of an example of a cooking area of the cooking apparatus of FIG. 1.

FIG. 2 is a perspective view of an example of a cooking area 200 of the cooking apparatus 100 of FIG. 1. The cooking area 200 can receive a food product (e.g., a cut of meat, vegetable, fruit, bread, or the like), and a cooking surface 210 can support the food product. The cooking surface 210 can include a continuous surface (e.g., a sheet), a semi-continuous surface, or the like. For example, the cooking surface 210 can include grates (e.g., a plurality of slats).

A temperature sensor 220 can be located in, or proximate to, the cooking area 200. For example, the temperature sensor 220 can be coupled to the frame 120 and located within the cooking area 200. The temperature sensor 220 can be located proximate to the cooking surface 210. The temperature sensor 220 can measure the air temperature within, or proximate to, the cooking area 200. The temperature sensor 220 can provide an electrical signal that is indicative of the temperature, within, or proximate to, the cooking area 200. For example, an electrical resistance of the temperature sensor 220 can vary depending upon variations of temperature proximate to the temperature sensor 220. The temperature sensor 220 can be in communication with a control circuit (e.g., the control circuit 700 shown in FIG. 7).

The temperature sensor 220 can be utilized to obtain the ambient air temperature. For example, the initial data provided by the temperature sensor 220 upon powering up a control circuit (e.g., the control circuit 702, shown in FIG. 7) can be indicative of the ambient air temperature. The ambient air temperature can establish a minimum cooking temperature for the apparatus 100. For example, cold smoking can include maintaining the temperature within the cooking area 200 within a range of 68° F. to 86° F.

The apparatus 100 can include a hood sensor 230. The hood sensor 230 can be configured to detect if the hood 110 (shown in FIG. 1) is in an open position or a closed position. For example, the hood sensor 230 can include an electrical switch, and changing the configuration of the hood between the open position and the closed position can operate the switch. For example, the hood 110 can engaged with the hood sensor 230 (e.g., a plunger) and activate the switch. The hood sensor 230 can be in communication with a control circuit (e.g., the control circuit 700 shown in FIG. 7).

Figure 3:
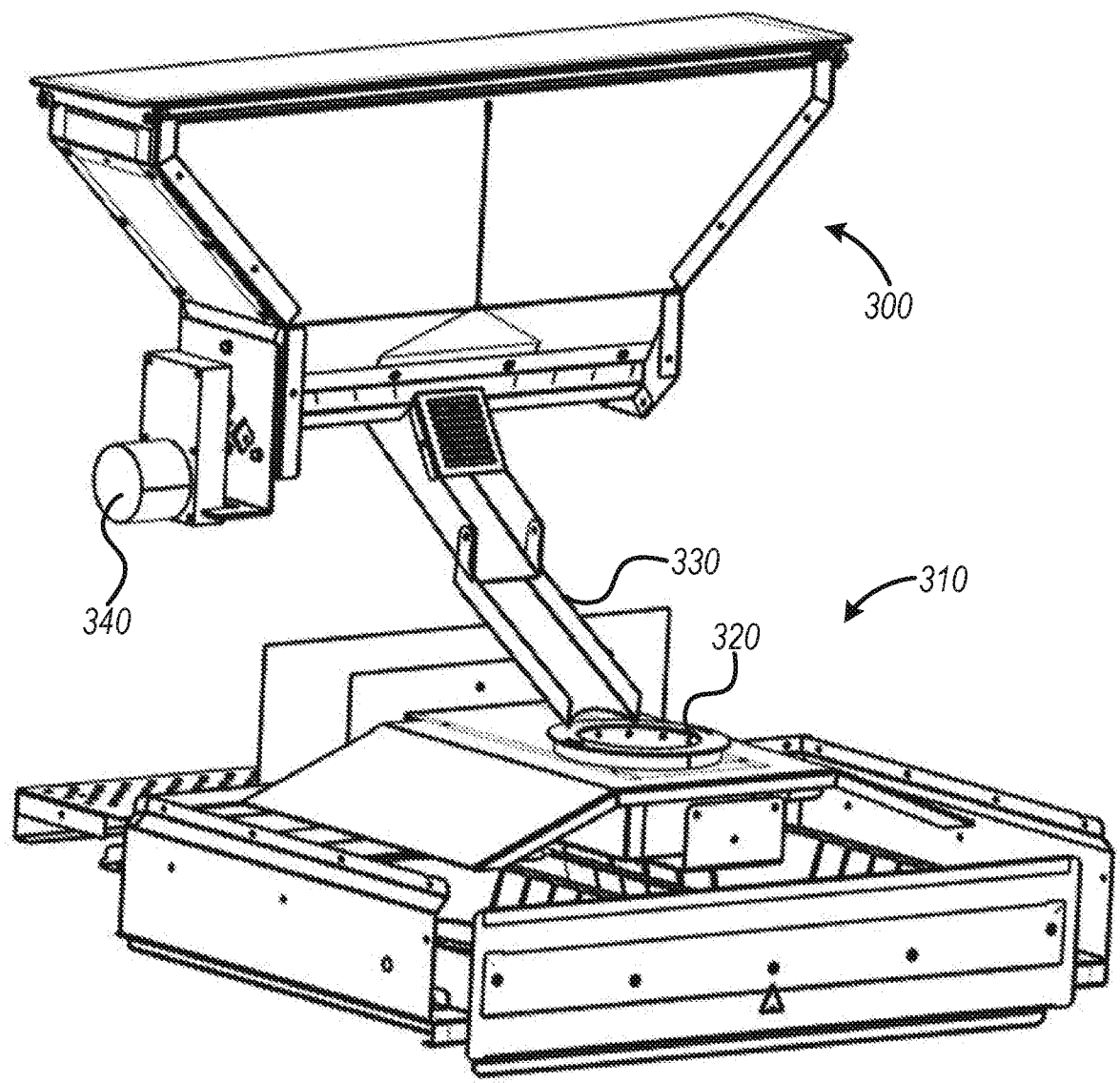
FIG. 3 is an isometric view of an example of a fuel feeder and an example of a combustion chamber.

FIG. 3 is a perspective view of an example of a fuel feeder 300 and an example of a combustion chamber 310. The apparatus 100 (shown in FIG. 1) can include the fuel feeder 300 and the combustion chamber 310. For example, the fuel feeder 300 and the combustion chamber 310 can be coupled to the frame 120 (shown in FIG. 1). The combustion chamber 320 can include a burn pot 320, and a fuel can combust within the burn pot 320. The fuel can include charcoal, propane, wood pellets (e.g., one or more of hickory, cherry, apple, mesquite, or the like), solid biofuels, other solid fuels, combinations thereof, or the like.

The fuel feeder 300 can supply the fuel to the combustion chamber 310. For example, the fuel feeder 300 can include a chute 330 and the chute 330 can transport (e.g., convey, direct, or the like) fuel discharged by the fuel feeder 300 to the burn pot 320. For instance, wood pellets can slide down the chute 330 and drop into the burn pot 320. The fuel feeder 300 can include a motor 340, and operation of the motor 340 can discharge fuel from the fuel feeder 300.

Figure 4:
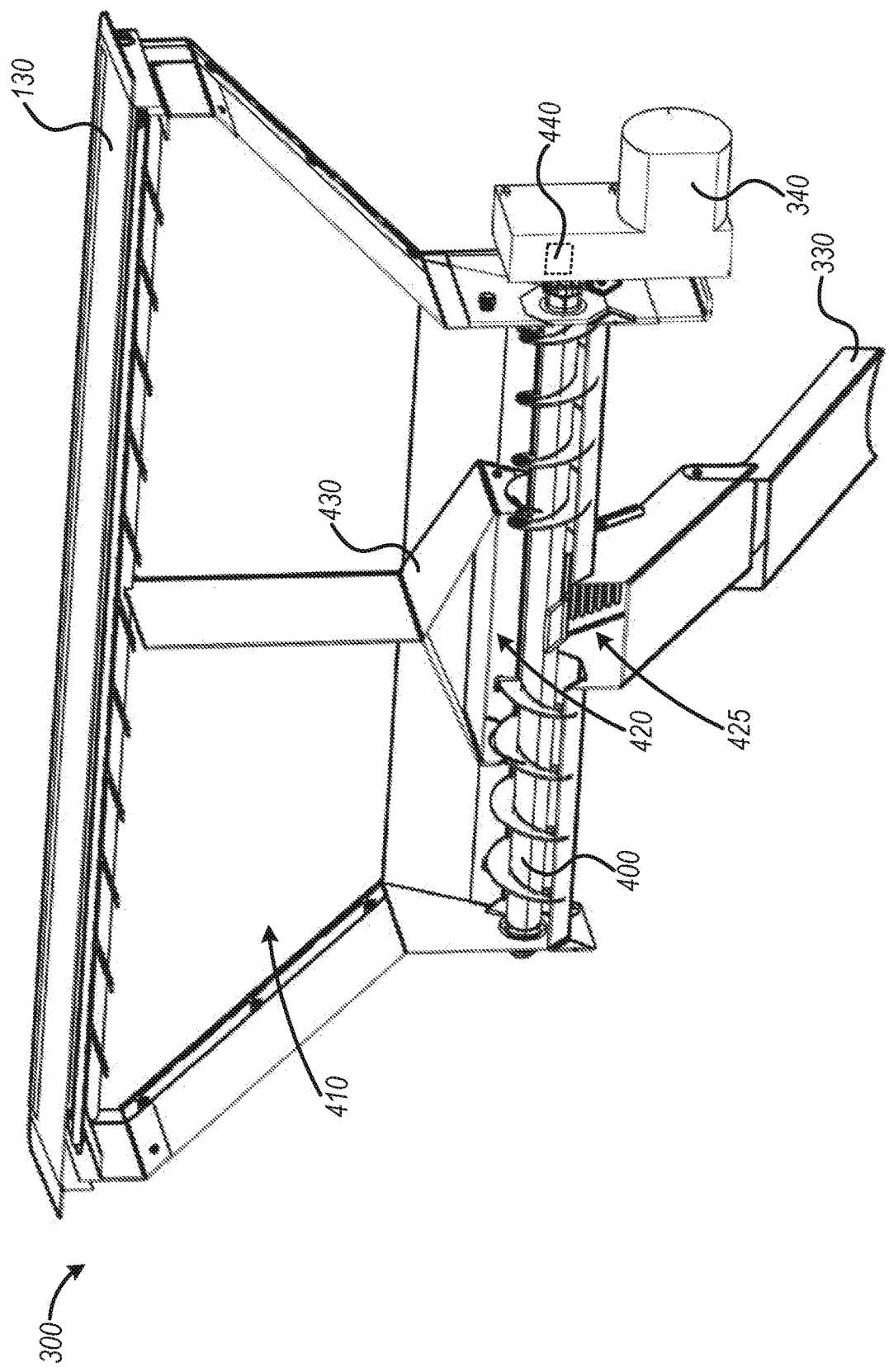
FIG. 4 is an isometric view of the fuel feeder of FIG. 3.

FIG. 4 is a perspective view the fuel feeder 300 of FIG. 3. Portions of the fuel feeder 300 have been hidden in FIG. 3 for clarity. The fuel feeder 300 can include a fuel reservoir 410, and fuel can be stored in the fuel reservoir 410. For instance, a user can open the lid 130 and place wood pellets into the fuel reservoir 410.

As described herein, the fuel feeder 300 can discharge fuel, for instance to supply the fuel to the combustion chamber 310 (shown in FIG. 3). For example, the motor 340 can operate (e.g., displace, rotate, move, turn, twist, or the like) an auger 400. Operation of the auger 400 can displace fuel contained with the fuel reservoir 410 and can discharge fuel from the fuel feeder 300. The motor 340 can be operated by a control circuit (e.g., the control circuit 702 and, or via, the fuel feeder 706 shown in FIG. 7). The motor 340 can be operated to vary the speed of the motor 340, varying the speed of the motor 340 can vary the speed (or displacement) of the auger 400. Varying the speed of the auger 400 can vary the amount of fuel conveyed by the auger 400. Accordingly, varying the speed of the auger 400 can correspondingly vary the amount of fuel discharged from the fuel feeder 300.

For example, the auger 400 can be operated by the motor 340, and the auger 400 can convey fuel from the fuel reservoir 410 toward a discharge section 420 of the fuel feeder 300. The fuel feeder 300 can include a discharge port 425, and fuel in the discharge section 420 can be discharged from the fuel feeder 300 through the discharge port 425. The discharge port 425 can be in communication with the chute 330, and fuel conveyed into the discharge section 420 can be discharged through the discharge port 425 and on to the chute 330.

The discharge section 420 can be separated (e.g., isolated, segregated, secluded, bifurcated, or the like) from the fuel reservoir 410. For example, a fuel baffle 430 can be included in the fuel feeder 300, and the fuel baffle 430 can help regulate the flow of fuel into the discharge section 420. The fuel baffle 430 can be sized and shaped to restrict (e.g., inhibit, prevent, slow, or the like) the flow of fuel into the discharge section 420. The fuel baffle 430 can be located in the fuel reservoir 410, and the fuel baffle 430 can allow the auger 400 to convey fuel into the discharge section 420 from the fuel reservoir 410. The fuel baffle 430 can help restrict the flow of fuel into the discharge section 420 so that only the fuel conveyed by the auger 400 can flow into the discharge section 420.

The fuel feeder 300 can include a fuel feeder sensor 440 (e.g., position sensor, angular displacement sensor, tachometer, or the like). The fuel feeder sensor 440 can be coupled to the motor 340, and can measure the speed of the motor 340, Alternatively, the fuel feeder sensor 340 can be coupled to the auger 400, and can measure the displacement (e.g. rotation) of the auger 400. The fuel feeder sensor 440 can provide an electrical signal that is indicative of the amount of fuel discharged by the fuel feeder 300.

The fuel feeder 300 can have a variety of configurations. For instance, the fuel feeder 300 may include additional augers 400 (or single- or multi-bladed auger(s)) or discharge ports 425. The dimensions, shape, or the like of the fuel feeder 300 can be varied. For example, the design of the fuel reservoir 410 can be varied, for instance depending upon needs of a customer.

Figure 5A:
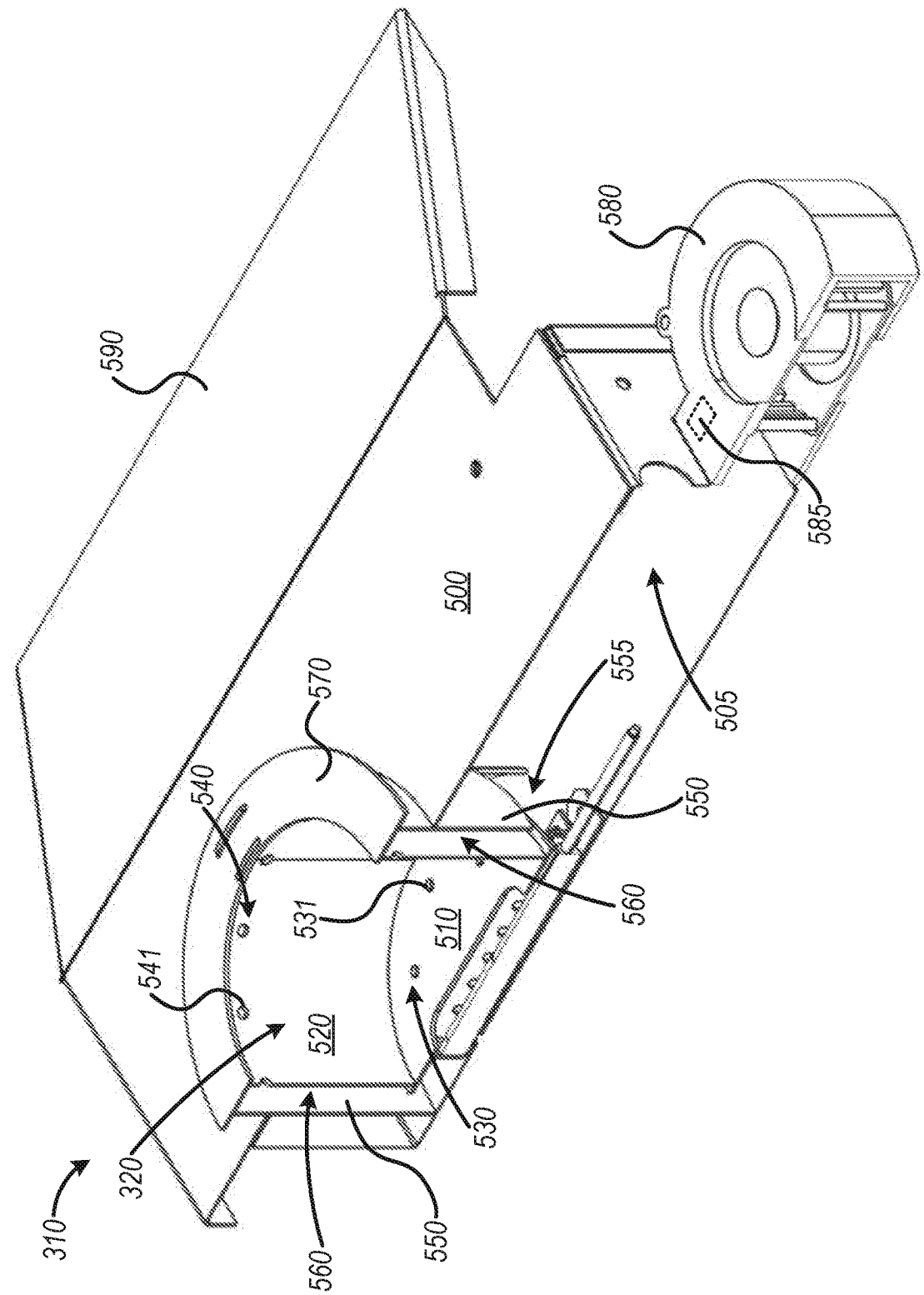
FIG. 5A is an isometric view of the combustion chamber of FIG. 3.

FIG. 5A is an isometric view of the combustion chamber 310 of FIG. 3. Portions of the combustion chamber 310 have been hidden from FIG. 5 for clarity. As described herein, the combustion chamber 310 can include the burn pot 320. The burn pot 320 can receive fuel, and the fuel can undergo at least one combustion process within the burn pot 320. As described in greater detail herein, the apparatus 100 (shown in FIG. 1) can include an air box 500, for instance the air box 500 can be included as part of the combustion chamber 310. The air box 500 can define an air chamber 505, and the air chamber 505 can be in communication with the burn pot 320. For instance, the air box 500 can direct air through the air chamber 505 and into the burn pot 320.

Figure 5B:
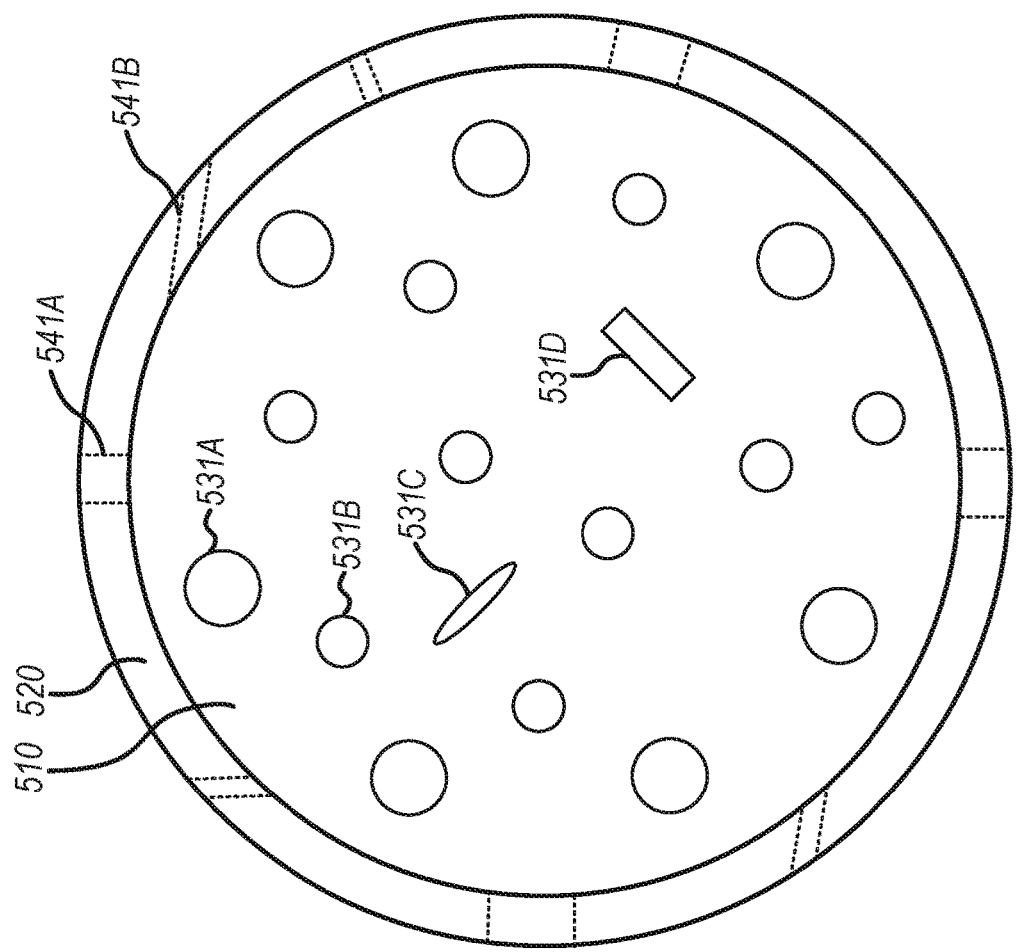
FIG. 5B is a top view of the combustion chamber 310 of FIG. 3.

The combustion chamber 310 can include a bottom wall 510 and at least one side wall 520. The bottom wall 510 and the side wall 520 can define the burn pot 320. The side wall 520 can be coupled to the bottom wall 510. As shown in FIGS. 5A and 5B, the side wall 520 and the bottom wall 510 can have a circular profile (e.g., the side wall 520 and the bottom wall 510 can generally form a cylinder with an open end). The side wall 520 and the bottom wall 510 can alternatively have a rectangular, polygonal, or irregularly shaped profile.

The combustion chamber 310 can include a first set of one or more air intakes 530, for instance a first air intake 531. The air intakes 530 can extend through the bottom wall 510, and the bottom wall 510 can define the air intakes 530. The air intakes 530 can have a circular profile, oblong profile, rectangular profile, or an irregular profile. For instance, the air intake 531 can be a circular through hole, or the air intake 531 can be a slot. The air intakes 530 can be in communication with the burn pot 320. The air intakes 530 can help facilitate the introduction of air into the burn pot 320 to help allow for a combustion process within the burn pot 320.

The combustion chamber 310 can include a second set of one or more air intakes 540, for instance a second air intake 541. The air intakes 540 can extend through the side wall 520, and the side wall 520 can define the air intakes 540. The air intakes 540 can have a circular profile, oblong profile, rectangular profile, or an irregular profile. For instance, the air intake 541 can be a circular through hole, or the air intake 541 can be a slot. The air intakes 540 can be in communication with the burn pot 320. The air intakes 540 can help facilitate the introduction of air into the burn pot 320 to help allow for a combustion process within the burn pot 320.

The combustion chamber 310 can include a manifold wall 550, and the manifold wall 550 can be sized and shaped to enclose a portion of the side wall 520. The manifold wall 550 can be spaced apart from the side wall 520. The side wall 520 and the manifold wall 550 can define a manifold chamber 560, and the manifold chamber 560 can be located between the side wall 520 and the manifold wall 550. The manifold wall 550 can define an intake recess 555, and the intake recess 555 can facilitate the introduction of air into the manifold chamber 560 from the air chamber 505. The combustion chamber 310 can include a damper, and the damper can be operated to vary the amount of air introduced into the manifold chamber 560.

The combustion chamber 310 can include a manifold plate 570, and the manifold plate 570 can be coupled to the side wall 520 and the manifold wall 550. The manifold plate 570 can extend between the side wall 520 and the manifold wall 550. The manifold plate 570 can define an end of the manifold chamber 560, and the manifold plate 570 can seal the end of the manifold chamber 560.

A fan or blower 580 can be coupled to the air box 500, and operation of the fan 580 can displace (e.g., blow, suck, push, pull, or the like) air into the air chamber 505 of the air box 500. The fan 580 can pressurize the air chamber 505 relative to an ambient air pressure of the environment proximate to the apparatus 100 (e.g., the pressure in the air chamber 505 can be greater than the ambient air pressure). The fan 580 can provide air for the combustion process within the burn pot 320. The fan 580 can help provide convective heating within the cooking area 200, for instance because the air blown into the burn pot 320 is discharged from the burn pot 320 and into the cooking area 200.

The fan 580 can be operated to vary the speed of the fan 580, and varying the speed of the fan 580 can vary the amount of air displaced by the fan 580. The fan 580 can be operated by a control circuit (e.g., the control circuit 702 shown in FIG. 7).

The air chamber 505 can be in communication with the air intakes 530, 540, and air can flow into the intakes 530, 540 from the air chamber 505. For example, the fan 580 can displace air into the air chamber 505, and the air can flow within the air chamber 505 and through the intake recess 555 to the manifold chamber 560. Air can flow from the manifold chamber 560 to the burn pot 320 through the intakes 530 in the bottom wall 510 and/or through the intakes 540 in the side wall 520. The manifold chamber 560 can be in communication with the air intakes 540, and the manifold chamber 560 can direct air into the air into the air intakes 540.

As described herein, fuel can undergo at least one combustion process within the burn pot 320. For example, air can be introduced into the air intakes 530 and the fuel (including, but not limited to solid wood pellets, or the like) can be combusted in the burn pot 320, for instance in a primary combustion process. The combustion of the fuel and the air can produce an exhaust. The air intakes 540 can introduce additional air into the burn pot 320 proximate to the exhaust located in the burn pot 320.

The air introduced by the air intakes 540 can mix with the exhaust, and a secondary combustion process (e.g., reaction, burn, oxidation) can occur within (or proximate to) the burn pot 320. The air can be introduced through the air intakes 540 by the fan 580 pressurizing the manifold chamber 560 or through natural draft provided by the primary combustion process (or a combination thereof). The secondary combustion process can produce additional heat (in comparison to a primary combustion process alone). The secondary combustion process can combust a portion of the exhaust of the primary combustion process. The combustion of the exhaust can improve the efficiency of the combustion of the fuel, for example by combusting portions of the fuel that would otherwise be exhausted to the environment surrounding the apparatus 100. Accordingly, the apparatus 100 can help decrease the amount of fuel needed to generate a desired temperature within the cooking area 200 (shown in FIG. 2), and can help decrease the amount of fuel needed to cook a food product, for example a food product supported by the cooking surface 210 (shown in FIG. 2).

The side wall 520 of the combustion chamber 310 can include a metal material. Heat can transfer from the burn pot 320 to the manifold chamber 560 through the side wall 520. The heat transfer from the burn pot 320 to the manifold chamber 560 can preheat the air in the manifold chamber 560, for instance to increase the natural draft through the manifold chamber 560 or to improve the efficiency of combustion within the burn pot 320.

The fan 580 can include a fan speed sensor 585 (e.g., position sensor, angular displacement sensor, tachometer, air displacement sensor, air speed sensor, air pressure sensor, or the like). The fan speed sensor 585 can be coupled to the fan 580, and can measure the speed of the fan 580, or the amount of air displaced by the fan 580. The fan speed sensor 585 can provide an electrical signal that is indicative of the speed of the fan 580, or the amount of air displaced by the fan 580.

A spark arrestor 590 can be coupled to the combustion chamber 310. The spark arrestor 590 can help improve the performance of the combustion chamber 310. For example, the spark arrestor 590 can help to reduce or prevent grease or other cooking byproducts from splashing undesirably or entering, at least in an undesirable or unintentional manner, the burn pot 320 or other areas where the grease or other cooking byproducts may ignite.

FIG. 5B is a top view of the combustion chamber 310 of FIG. 3. The air intakes 530, 540 can have a variety of profiles and configurations. For example, the air intakes 530, 540 can have a variety of dimensions (e.g., sizes), shapes, patterns, orientations, or the like. For instance, an air intake 531A can be a different size than an air intake 531B. The air intake 531B can have a different shape than an air intake 531C or an air intake 531D. The air intakes 530 can extend through the bottom wall 510 at an angle, and the air intakes 540 can extend through the side wall 520 at an angle. For instance, air intake 541A can extend perpendicularly through the side wall 520, and air intake 541B can extend at an angle through the side wall 520. The air intakes 530, 540 can have a uniform arrangement (e.g., equally spaced, aligned, or the like) or a non-uniform arrangement (e.g., the location of the air intakes 530, 540 can be located sporadically along the walls 510, 520). The dimension, shape, pattern, orientation, or the like of the air intakes 530, 540 can be adjusted to alter the combustion process within the burn pot 320. For example, the air intake 541B can be angled to provide turbulent air into the burn pot 320.

Figure 6:
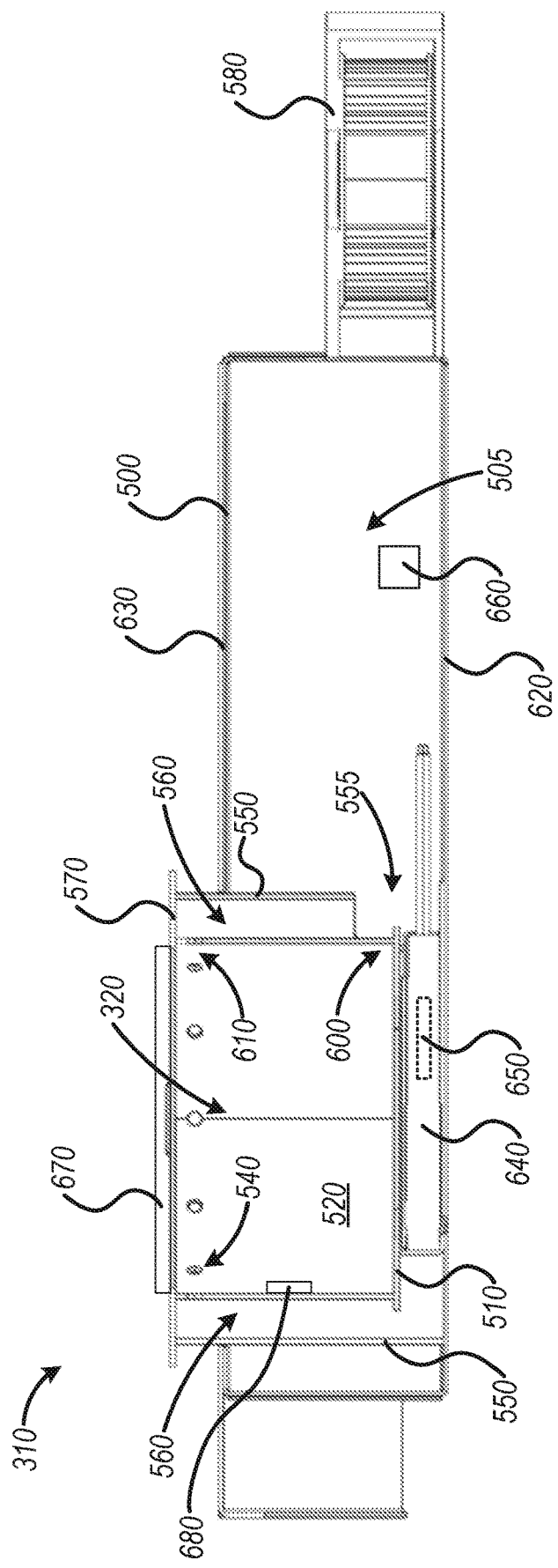
FIG. 6 is a side view of the combustion chamber of FIG. 3.

FIG. 6 is a side view of the combustion chamber 310 of FIG. 3. Portions of the combustion chamber 310 have been hidden from FIG. 6 for clarity. The side wall 520 can have a first end 600 and a second end 610. The first end 600 of the side wall 520 can be coupled to the bottom wall 510. The air intakes 540 can be defined in the side wall 520 proximate to the second end 610 of the side wall 520. Locating the air intakes 540 proximate to the second end 610 can help facilitate combustion of the exhaust in the burn pot 320.

As described herein, the fan 580 can displace air into the air chamber 505, and the air can flow through the intake recess 555 and into the manifold chamber 560. The intake recess 555 can be located at the interface between the manifold chamber 560 and the air chamber 505. A portion or portions of the manifold wall 550 can partially extend between a first (e.g., bottom) wall 620 of the air box 500 and a second (e.g., top) wall 630 of the air box 500. For example, a section of the manifold wall 550 can extend partially between the walls 620, 630 to define the intake recess 555. Other portions of the manifold wall 550 can extend fully between the walls 620, 630. The manifold chamber 560 can also include space located between the bottom wall 510 and the first wall 620 of the air box 500.

The combustion chamber 310 can include an ignitor 640. The ignitor 640 can initiate a combustion process in the burn pot 320. The ignitor 640 can be operated by a control circuit (e.g., the control circuit 702 shown in FIG. 7). The combustion chamber 310 can include an ignition sensor 650. The ignition sensor 650 can detect the flow of current through the ignitor 640, for instance to help determine if the ignitor 640 is functioning properly. The ignition sensor 650 can be in communication with a control circuit (e.g., the control circuit 702 shown in FIG. 7), and the ignition sensor 650 can provide an electrical signal (or modulate an electrical signal) to the control circuit.

The combustion chamber 310 can include a temperature sensor 660, and the temperature sensor 660 can measure the temperature in, or proximate to, the combustion chamber 310 (e.g., the temperature of air that is displaced into the air chamber 505). For example, the second temperature sensor 660 can be located within the air chamber 505 and can measure the temperature proximate to the fan 580. Alternatively, the temperature sensor 660 can be located proximate to the fuel feeder 300 (shown in FIG. 3) and can measure the temperature proximate to the fuel feeder 300. The temperature sensor 660 can be similar to the temperature sensor 220 (shown in FIG. 2).

The combustion chamber 310 can include one or more dampers 670 (e.g., one or more louvers, valves, or the like) on, over, or positioned within the combustion chamber 310 or burn pot 320. The one or more dampers 670 can restrict or control air flow within the combustion chamber 310 or burn pot 320. For example, the dampers 670 can restrict or control air flow from exiting the burn pot 320. The dampers 670 can restrict or control air flow from one or more of the air inlets 530, 540 into the burn pot 320. The dampers 670 can be operated to alter the combustion process within the burn pot 320, for instance to vary the type (or quantity) of smoke generated as a result of the combustion process.

The combustion chamber 310 can include a flame sensor 680. For example, the flame sensor 680 can be located in the burn pot 320, and the flame sensor 680 can detect the presence of a flame within the burn pot 320. For instance, the flame sensor 680 can be in communication with a control circuit (e.g., the control circuit 702 shown in FIG. 7), and the ignition sensor 650 can provide an electrical signal (or modulate an electrical signal) to the control circuit. The flame sensor 680 can provide an electrical signal indicative of whether a flame is present, or if a flame is not present, for instance to determine if a flame within the combustion chamber 320 has been extinguished. The control circuit can control the ignitor 640 to reignite the flame if the flame sensor indicates that the flame has been extinguished.

Figure 7:
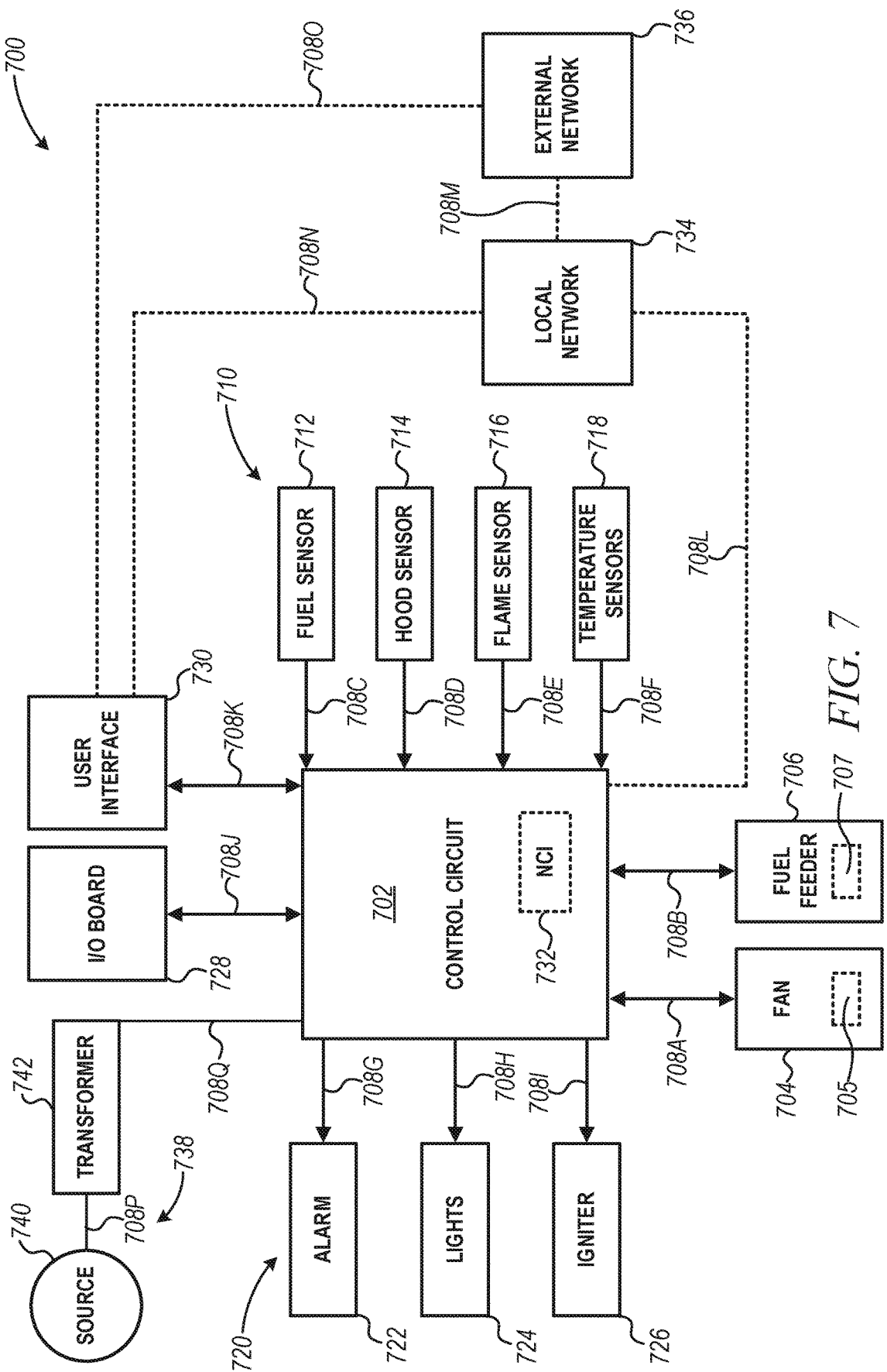
FIG. 7 is a schematic view of an example of a system for cooking a food product.

FIG. 7 is a schematic view of an example of a system 700 for cooking a food product. The system 700 can include the apparatus 100 (shown in FIG. 1). The system 700 can include a control circuit 702, and the control circuit 702 can be in communication with one or more components of the system 700. For example, the system 700 can include a fan 704. The fan 704 can be similar to the fan 580 (shown in FIG. 5A).

An electrical communication pathway 708A (e.g., a conductor, for instance a wire or the like) can facilitate the communication between the control circuit 702 and the fan 704. The control circuit 702 can transmit a direct current electrical signal, and the pathway 708A can transmit the direct current signal between the fan 704 and the control circuit 702. The control circuit 702 can modulate the direct current signal, and modulating the direct current signal can vary the speed of the fan 704. Modulating the direct current signal can help increase the resolution of changes to the speed of the fan 704, and can help increase the precision of controlling the speed of the fan 704.

The system 700 can include a fan speed sensor 705 (e.g., position sensor, angular displacement sensor, tachometer, air displacement sensor, air speed sensor, air pressure sensor, or the like). The fan speed sensor 705 can be similar to the fan speed sensor 585 (shown in FIG. 5A). The fan speed sensor 705 can be coupled to the fan 704, and can measure the speed of the fan 704, or the amount of air displaced by the fan 704. The fan speed sensor 705 can be in communication with the control circuit 702 through the pathway 708A. The fan speed sensor 705 can provide an electrical signal that is indicative of the speed of the fan 704, or the amount of air displaced by the fan 704. For example, the control circuit 702 can receive an electrical signal (e.g., an analog signal, digital signal, alternating current, a direct current, or the like) from the fan speed sensor 705 and the control circuit 702 can modulate the speed of the fan 704 to ensure that the fan 704 is operating at a desired speed (and displacing a desired amount of air).

The system 700 can include a fuel feeder 706, and the fuel feeder 706 can be similar to the fuel feeder 300 (shown in FIG. 3). For example, the fuel feeder 706 can include the motor 340 (shown in FIG. 3). The control circuit 702 can be in communication with the fuel feeder 706. An electrical communication pathway 708B can facilitate the communication between the control circuit 702 and the fuel feeder 706. The control circuit 702 can transmit a direct current signal to the fuel feeder 706. The control circuit 702 can modulate the direct current signal, and modulating the direct current signal can vary the amount of fuel discharged from the fuel feeder 706. For instance, the direct current signal can vary the speed of the motor 340 or the speed (or displacement) of the auger 400 (shown in FIG. 4). Modulating the direct current signal can help increase the resolution of the amount of fuel discharged from the fuel feeder 300, and can help increase the precision of controlling the amount of fuel discharged from the fuel feeder.

The system 700 can include a fuel feeder sensor 707 (e.g., position sensor, angular displacement sensor, tachometer, or the like). The fuel feeder sensor 707 can be similar to the fuel feeder sensor 440 (shown in FIG. 4). The fuel feeder sensor 707 can be coupled to the motor 340, and can measure the speed of the motor 340. The fuel feeder sensor 707 can be coupled to the auger 400 and can measure the displacement (e.g. rotation) of the auger 400. The fuel feeder sensor 707 can be in communication with the control circuit 702 through the pathway 708B. The fuel feeder sensor 707 can provide an electrical signal that is indicative of the amount of fuel discharged by the fuel feeder 706. For example, the control circuit 702 can receive an electrical signal (e.g., an analog signal, digital signal, alternating current, a direct current, or the like) from the fuel feeder sensor 707 and the control circuit 702 can modulate the speed of the motor 340 (or the auger 400) to ensure that the fuel feeder 706 is discharging a desired amount of fuel.

The control circuit 702 can determine an air-to-fuel ratio of the system 700. For example, the air-to-fuel ratio can include the amount of air displaced by the fan 704 compared to the amount of fuel discharged from the fuel feeder 706. The control circuit can receive an electrical signal from the fan sensor 705 and an electrical signal from the fuel feeder sensor 707. The control circuit 702 can determine the air-to-fuel ratio from the signals provided by the sensors 705, 707.

The air-to-fuel ratio of the system 700 (e.g., within the burn pot 320) can be adjusted by the control circuit 702. Adjusting the air-to-fuel ratio can vary the type of smoke generated by the combustion process (or processes, such as a primary and secondary combustion process). For example, the control circuit 702 can modulate the signal transmitted to the fan 704 (e.g., by increasing or decreasing the direct current in the pathway 708A) to vary the speed of the fan. Modulating the signal to the fan 704 can adjust the air-to-fuel ratio of the system 700. The control circuit 702 can modulate the signal transmitted to the fuel feeder 706 (e.g., by increasing or decreasing the direct current in the pathway 708B) to vary the amount of fuel discharged by the fuel feeder 706. Modulating the signal to the fuel feeder 706 can adjust the air-to-fuel ratio of the system 700. The control circuit 702 can modulate both the speed of the fan 704 and the amount of fuel discharged by the fuel feeder 706 to adjust the air-to-fuel ratio.

The control circuit 702 can maintain the air-to-fuel ratio of the system 700 within an air-to-fuel threshold. For example, maintaining the air-to-fuel ratio can provide a blue smoke during a combustion process. Blue smoke can provide a palatable flavor profile to a food product that undergoes a cooking operation. White smoke can provide an unpalatable flavor profile to the food product. Accordingly, the apparatus 100 or the system 700 can help improve the flavor profile of the food product, including (but not limited to) by adjusting (or maintaining) the air-to-fuel ratio of a combustion process within the burn pot 320 (shown in FIG. 3).

The air-to-fuel ratio may be varied depending upon one or more inputs of the system 700. For example, the type of fuel used (e.g., type of wood pellets, charcoal, or the like), temperature in the cooking area 200 (shown in FIG. 2), type or amount of smoke desired, or the like can be utilized to vary the amount of air displaced by the fan 704 or the amount of fuel discharged by the fuel feeder 706. For instance, the temperature in the cooking area 200 can be maintained by increasing or decreasing the amount of fuel discharged from the fuel feeder 706. The temperature in the cooking area 200 can be maintained by increasing or decreasing the amount of air displaced by the fan 704.

FIG. 7 shows that the system 700 can include a plurality of sensors 710. The sensors 710 can transmit electrical signals (e.g., analog signals, digital signals, direct current signals, alternating current signals, or the like) to the control circuit 702. For example, the system 700 can include a fuel sensor 712 that can provide an electrical signal indicative of the amount of fuel in the system 700 (e.g., the amount of fuel in the fuel reservoir 410, shown in FIG. 4). An electrical communication pathway 708C can facilitate the electrical communication between the fuel sensor 712 and the control circuit 702.

The system 700 can include a hood sensor 714, and the hood sensor 714 can be similar to the hood sensor 230 (shown in FIG. 2). The hood sensor 714 can provide an electrical signal that is indicative of whether the hood 110 (shown in FIG. 1) is in the open position or the closed position. An electrical communication pathway 708D can facilitate the electrical communication between the hood sensor 714 and the control circuit 702.

The system 700 can include a flame sensor 716, and the flame sensor 716 can be similar to the flame sensor 650 (shown in FIG. 6). The flame sensor 716 can provide an electrical signal that is indicative of the presence of a flame within the burn pot 320 (shown in FIG. 6). An electrical communication pathway 708E can facilitate the electrical communication between the flame sensor 716 and the control circuit 702.

The system 700 can include one or more temperature sensors 718, for instance the temperature sensor 220 (shown in FIG. 2) or the temperature sensor 660 (shown in FIG. 6). The temperature sensors 718 can provide an electrical signal of the temperature at, or proximate to, one or more components of the system 700 (e.g., the cooking area 200 or the air chamber 505, shown respectively in FIGS. 2 and 5). An electrical communication pathway 708F can facilitate the electrical communication between the temperature sensors 718 and the control circuit 702.

The control circuit 702 can modulate the electrical signal transmitted to the fan 704 or modulate the electrical signal transmitted to the fuel feeder 706 based upon a signal provided by the temperature sensors 718. For example, the control circuit 702 can increase the amount of fuel discharged from the fuel feeder 704 if signal provided by the temperature sensor 220 is below a temperature threshold. For example, the control circuit 702 can operate the auger 400 (shown in FIG. 4) if the temperature in the cooking area 200 (shown in FIG. 2) is lower than a desired temperature threshold selected by a user of the apparatus 100 (for example, through user interface 730, described below). The control circuit 702 can maintain the temperature within the cooking area 200 (shown in FIG. 2) by modulating the electrical signal transmitted to the fan 704, and/or by modulating the electrical signal transmitted to the fuel feeder 706. The control circuit 702 can maintain the temperature within the cooking area 200 within a desired range of temperatures (e.g., 180° F. to 185° F., 200° F. to 205° F., 312° F. to 322° F., 348° F. to 352° F., or any other suitable temperature range).

The system 700 can include one or more accessories 720. The control circuit 702 can operate the accessories 720. For example, the system 700 can include an alarm 722. The alarm can indicate a desired cooking time has elapsed, the fuel reservoir 410 (shown in FIG. 4) is low on fuel, the flame sensor 716 does not detect the presence of a flame within the burn pot 320 (shown in FIG. 3), or the like. An electrical communication pathway 708G can facilitate the electrical communication between the alarm 722 and the control circuit 702.

The system 700 can include one or more lights 724. The lights 724 can be coupled with the frame 120 of the apparatus 100 (shown in FIG. 1). The lights 724 can be coupled with the hood H0 (shown in FIG. 1). The lights 724 can illuminate portions of the system 700 (or the apparatus 100), for example to facilitate operation of the system 700 (or the apparatus 100) during low ambient light conditions (e.g., dawn, dusk, night, or the like). The lights 724 can be activated when the hood 110 (shown in FIG. 1) is opened (e.g., the hood sensor 230 can act as a switch to control the lights 724), or the lights 724 can be manually activated, for instance by a user. An electrical communication pathway 708H can facilitate the electrical communication between the lights 724 and the control circuit 702.

The system 700 can include an igniter 726, and the igniter 726 can be similar to the ignitor 640 (shown in FIG. 6). The control circuit 702 can operate the igniter 726 and initiate the combustion process in the burn pot 320 (shown in FIG. 3). An electrical communication pathway 708I can facilitate the electrical communication between the igniter 726 and the control circuit 702.

The system 700 can include an input/output board 728. The board 728 can facilitate the communication between the control circuit 702 and external components. The board 728 can be in communication with the control circuit 702 through an electrical communication pathway 708J. For example, the board 728 can change the system 700 between a powered state (e.g., turn the system 700 on) and an unpowered state (e.g., turn the system 700 off). The board 728 can include a universal serial bus ("USB") interface, an ethernet port, or the like. For example, the board 728 can facilitate connecting one or more food temperature probes to the system 700. The probes can be inserted into a food product (e.g., a cut of meat), and can be utilized to measure the temperature within the food product. The system 700 can be configured to stop discharging fuel from the fuel feeder 704 when the temperature in the food product exceeds a temperature threshold. The control circuit 702 can activate the alarm 720 when the temperature in the food product exceeds a temperature threshold.

The system 700 can include a user interface 730. For example, the user interface 730 can include (but is not limited to) a display coupled with the frame 120 (shown in FIG. 1), a graphical user interface provided on a web browser, a mobile device (e.g., smartphone, tablet, or the like), a computer application (e.g., an application for a desktop computer or a laptop computer), or the like. The user interface 730 can communicate with the control circuit 702 through an electrical communication pathway 708K. Alternatively or additionally, the user interface 730 can be provided remotely through a local network 734 via a communication pathway 708N, or through an external network 736 via a communication pathway 708O. The local network 734 can be a wired (e.g., ethernet, fiber optic, or the like) network or a wireless network (e.g., WiFi, Bluetooth, Near Field Communication, or the like).

One or more functions of the system 700 can be monitored by a user. For example, the user interface 730 can provide (e.g., display) the amount of fuel being discharged from the fuel feeder 706 (e.g., by receiving a signal from the fuel feeder sensor 707). The user interface 730 can provide the amount of air being displaced by the fan 704 (e.g., by receiving a signal from the fan speed sensor 705).

The user interface 730 can communicate with the control circuit 702 to operate one or more functions of the system 700 (e.g., activating the ignitor 726, the lights 724, adjusting the speed of the fan 704, or the like). The user interface 730 can communicate with the control circuit 702 to adjust the air-to-fuel ratio of the system 700. For example, the air-to-fuel ratio can be user-selectable, and a user can input a desired air-to-fuel threshold into a display, and the control circuit 702 can maintain the air-to-fuel ratio within the user-selected air-to-fuel ratio threshold.

The system 700 can include a network communication interface 732 in communication with the control circuit 702. The interface 732 can be included in the control circuit 702. The interface 732 can transmit or receive one or more electrical signals between the control circuit 702 and the local network 734 (e.g., a residential wireless internet network, a local area network, or the like). The local network 734 can communicate with the control circuit 702 through a communication pathway 708L (e.g., an ethernet connection, a wireless internet connection, a USB connection, Bluetooth connection, or the like). The interface 732 can transmit or receive one or more signals between the control circuit 702 and the external network 736 (e.g., a server, a cloud-based server, cellular service, or the like). For instance, the local network 736 can communicate with the external network 736 through a communication pathway 708M. The system 700 can be updated through the local network 734 or the external network 734 (e.g., the system 700 can receive software revisions, firmware revisions, or the like from the networks 734, 736).

The network communication interface 732 can receive (e.g., monitor, observe, or the like) one or more signals from the control circuit 702. For example, the interface 732 can receive one or more of the signals transmitted through the communication pathways 708A through 708Q. The interface 732 can directly transmit one or more of the signals transmitted through the communication pathways 708A through 708Q. The interface 732 can alternatively transmit a signal that corresponds to the one or more signals transmitted through the communication pathways 708A through 708Q. For example, the interface 732 can transmit a digital signal that corresponds to an analog signal that is transmitted through the pathway 708A. For instance, the control circuit 702 can transmit a direct current signal that operates the fan 704. The interface 732 can also receive the signal from the control circuit 702 and transmit a digital signal (e.g., through the pathway 708L) that corresponds to the direct current signal (e.g., a digital signal indicating the voltage or the current in the pathway 708A).

As described herein, the control circuit 702 can determine the air-to-fuel ratio of the system 700. The control circuit 702 can transmit the determined air-to-fuel ratio to the network communication interface 732. The interface 732 can receive the determined air-to-fuel ratio, and the interface 732 can transmit the air-to-fuel ratio to one or more of the networks 734, 736. For example, a user can remotely monitor the air-to-fuel ratio of the system 700. Remotely monitoring the air-to-fuel ratio can include (but is not limited to) accessing the user interface 730 through a web portal or a downloadable application (e.g., an "app").

As described herein, one or more functions of the system 700 can be monitored by a user. For example, the network communication interface 732 can facilitate the remote monitoring of the amount of fuel being discharged from the fuel feeder 706 (e.g., by receiving a signal from the fuel feeder sensor 707). The interface 732 can facilitate the remote monitoring of the amount of air being displaced by the fan 704 (e.g., by receiving a signal from the fan speed sensor 705). The user interface 730 can be remotely accessed, and provide the monitored signals to a user located remote from one or more components of the system 700 (or the apparatus 100).

As introduced above, the control circuit 702 can be operated either locally (e.g., by a user interacting with a display), or remotely (e.g., through the local network 734 or the external network 736). For example, the electrical communication pathway 708K can facilitate the local operation of the system 700 with the user interface 730. The pathway 708N or the pathway 708O can facilitate the remote operation of the system 700 via local network 734 or external network 736. For instance, a remote user (e.g., a user located away from the apparatus 100) can access the system 700 over the internet and monitor the status of the system 700 (or the apparatus 100), provide inputs to, set or modify parameters (e.g., desired cooking temperature, desired air-to-fuel ratio, etc.) of, or otherwise operate the system 700 (or the apparatus 100), or troubleshoot or diagnose any issue(s) with the system 700 (or the apparatus 100). The remote user can include (but is not limited to) an owner of the apparatus, a technician, manufacturer representative, support representative, or the like.

As some specific, but not limiting, examples, a remote user can adjust the signal provided to the fan 704 to vary the speed of the fan 704. A remote user can adjust the signal provided to the fuel feeder 706 to vary the amount of fuel discharged from the fuel feeder 706. A remote user can adjust a temperature threshold to maintain the temperature in the cooking area 200. A remote user can adjust the air-to-fuel ratio of the system 700. A remote user can verify that the fan 704 is operating at a desired rate by monitoring the signal output from the fan speed sensor 705. A remote user can verify that the fuel feeder 706 is operating as intended, for instance by monitoring the signal output from the fuel feeder sensor 707. A remote user can determine if the system 700 is operating as intended, and can adjust one or more functions of the system 700 in order to compensate for an issue, or to determine if the system 700 needs to be serviced (e.g., determining if the fan 704 needs to be replaced due to a malfunction).

The system 700 can include power components 738. For example, a power source 740 can provide electrical energy (e.g., 110 VAC to 600 VAC, or the like) to the system 700. A transformer 742 can be in communication with the power source 740 through an electrical communication pathway 708P. The transformer 742 can modify the electrical energy provided by the power source 740 and provide power to the system 700 through an electrical communication pathway 708Q. For example, the transformer 742 can transmit power (e.g., 12 VDC, 24 VDC, 24 VAC, or the like) to the control circuit 702 through the pathway 708Q.

The system 700 can use closed-loop feedback to control one or more functions of the system 700. For example, the system 700 can be set with a desired temperature in the cooking area 200 and/or air-to fuel ratio for the system 700. The system 700 can automatically maintain (or substantially maintain) the desired temperature and/or air-to-thel ratio, for example by controlling the speed (or displacement) of the fan 704 and the fuel feeder 706. The system 700 can monitor the actual speed (or displacement) of the fan 704 and the fuel feeder 706 with the sensors 705, 707, respectively, in order to ensure that the fan and the fuel feeder are operating as intended.

Figure 8:
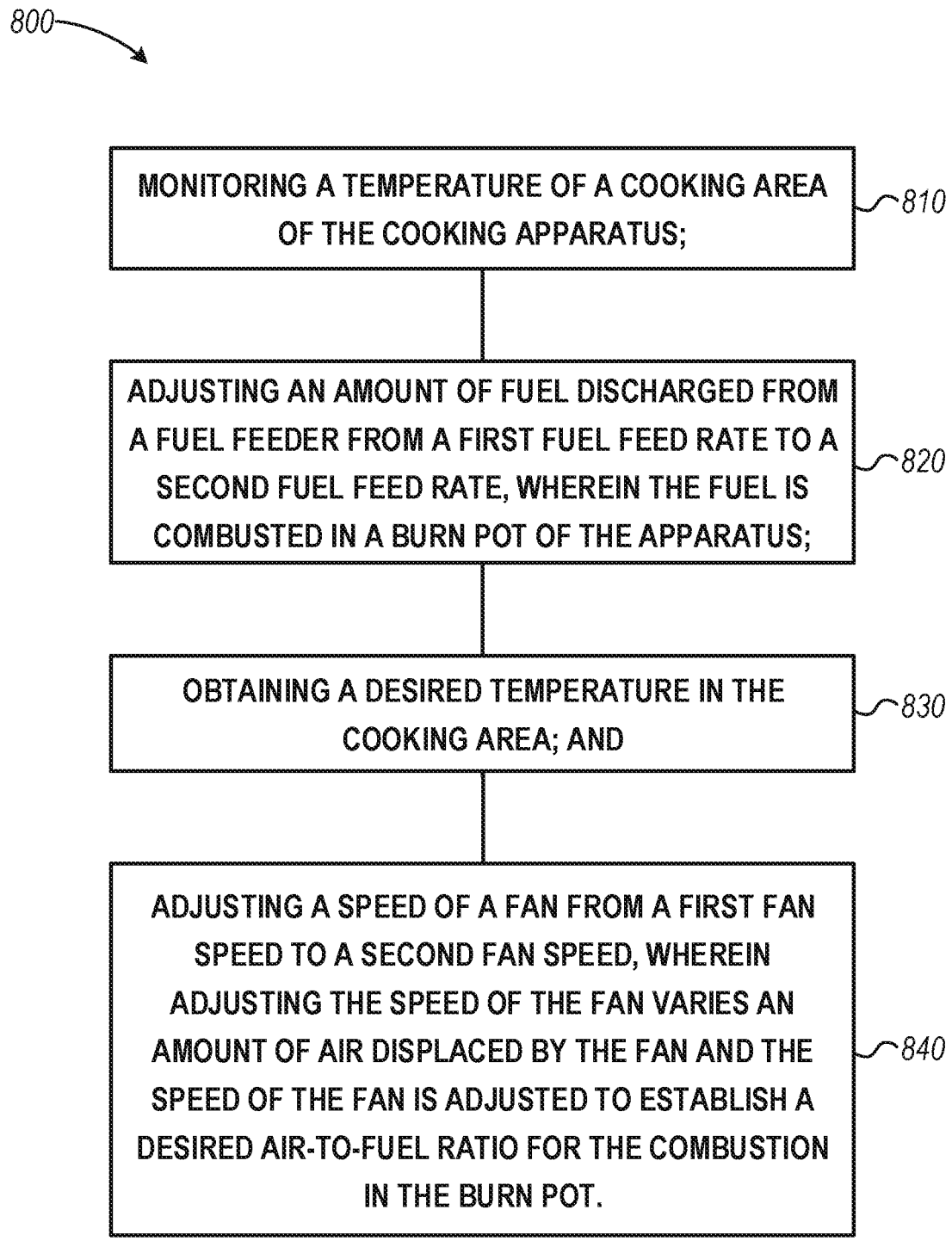
FIG. 8 shows one example of a method for controlling a cooking apparatus.

FIG. 8 shows one example of a method 800 for controlling a cooking apparatus, including one or more of the apparatus 100 or the system 700 described herein. In describing the method 800, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 800 include, but are not limited to, the corresponding numbered elements provided herein and other corresponding elements described herein (both numbered and unnumbered) as well as their equivalents.

At 810, a temperature of a cooking area 200 of the cooking apparatus 100 can be monitored. At 820, an amount of fuel discharged from a fuel feeder 300 can be adjusted between a range of fuel rates, such as from a minimum fuel feed rate to a maximum fuel feed rate, and any fuel rate therebetween. The fuel can be combusted in a combustion chamber 310 of the apparatus 100. The method 800 can include at 830 obtaining a desired temperature in the cooking area 200. At 840, a speed of a fan 580 can be adjusted from a first fan speed to a second fan speed. Adjusting the speed of the fan 580 can vary an amount of air displaced by the fan 580. The speed of the fan 580 can be adjusted to establish a desired air-to-fuel ratio (e.g., an air-to-fuel ratio threshold) for the combustion in the combustion chamber 310.

Several options for the method 800 follow. For example, the desired air-to-fuel ratio can be approximately one or more. The amount of fuel discharged from the fuel feeder 300 can be adjusted from the second fuel feed rate to a third fuel feed rate. The speed of the fan 580 can be adjusted from the second fan speed to a third fan speed. The desired air to fuel ratio can be maintained, for example by adjusting the speed of the fan 580 or by adjusting the amount of fuel discharged from the fuel feeder 300.

Figure 9:
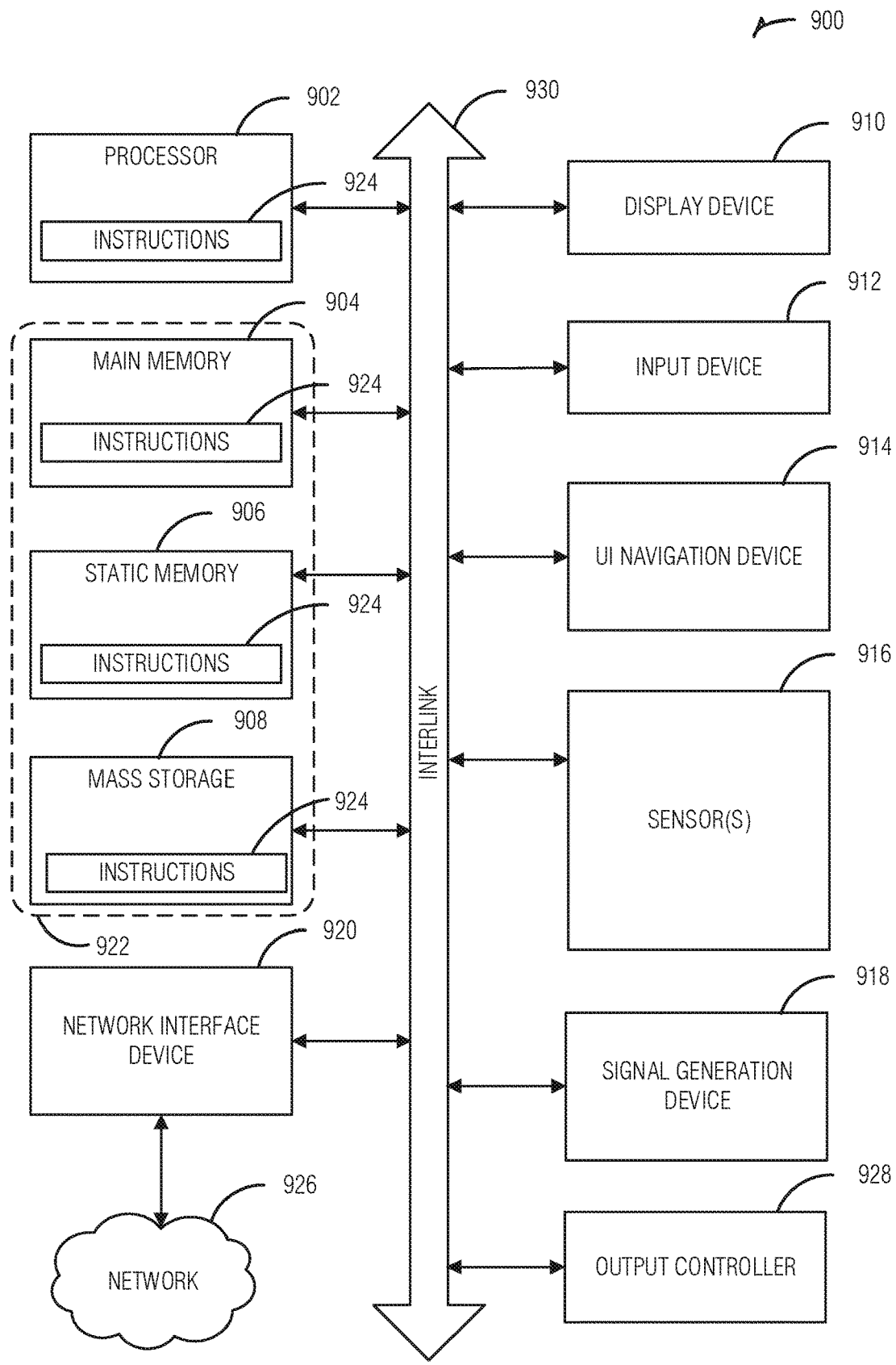
FIG. 9 is a block diagram illustrating an example of a machine upon which one or more embodiments may be implemented.

FIG. 9 illustrates a block diagram of an example machine 900 that may be utilized for system 700, control circuit 702, or a user device upon which user interface 730 may be provided. Of course, not all components of machine 900 are needed for any given system 700, control circuit 702, or user device, and FIG. 9 is provided solely to provide an example of the types of components that may be included. Likewise, other components, such as but not limited to some of the components illustrated in FIG. 7, could also be included as part of machine 900.

The machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a printed circuit comprising components, a personal computer (PC), a tablet PC, a set-top box (STB), a personal digital assistant (PDA), a mobile telephone or smartphone, a web appliance, a network router, switch or bridge, or any other computing device or processing apparatus or machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (MOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912, and UI navigation device 914 may be a touch screen display. The machine 900 may additionally include a signal generation device 918 (e.g., a speaker), a network interface device 920, and one or more sensors 916, such as a global positioning system (GPS) sensor, compass, accelerometer, or other sensors (such as the sensors described with respect to FIG. 7). The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, temperature probe, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute machine readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 (such as, but not limited to, local network 734 or external network 736) using a transmission medium via the network interface device 920 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

VARIOUS NOTES & ASPECTS

Aspect 1 may include or use subject matter (such as an apparatus, a system, a device, a method, a means for performing acts, or a device readable medium including instructions that, when performed by the device, may cause the device to perform acts), such as may include or use an apparatus for cooking a food product, comprising: a combustion chamber configured to burn one or more fuel sources, including: a burn pot defined by a side wall and a bottom wall, wherein the bottom wall is coupled to the side wall; a first air intake extending through the bottom wall; a second air intake extending through the side wall; and an air box coupled to the combustion chamber, the air box defining an air chamber, wherein the air chamber is in communication with the first air intake and the second air intake.

Aspect 2 may include or use, or may optionally be combined with the subject matter of Aspect 1, to optionally include or use a manifold wall sized and shaped to enclose a portion of the side wall, wherein the manifold wall is spaced apart from the side wall; a manifold chamber located between the manifold wall and the side wall, wherein the manifold chamber is in communication with the air chamber; and wherein the second air intake is in communication with the manifold chamber.

Aspect 3 may include or use, or may optionally be combined with the subject matter of Aspect 2 to optionally include or use wherein the manifold wall defines an intake recess located at the interface between the manifold chamber and the air chamber.

Aspect 4 may include or use, or may optionally be combined with the subject matter of one or any combination of Aspects 2 or 3 to optionally include or use wherein a portion of the manifold wall extends between a first wall of the air box and a second wall of the air box.

Aspect 5 may include or use, or may optionally be combined with the subject matter of one or any combination of Aspects 2 through 4 to optionally include or use wherein the side wall of the burn pot comprises a metal material.

Aspect 6 may include or use, or may optionally be combined with the subject matter of one or any combination of Aspects 2 through 5 to optionally include or use a manifold plate extending between the side wall and the manifold wall.

Aspect 7 may include or use, or may optionally be combined with the subject matter of one or any combination of Aspects 1 through 6 to optionally include or use wherein the first air intake is included in a plurality of air intakes, and the plurality of air intakes extend through the bottom wall of the burn pot.

Aspect 8 may include or use, or may optionally be combined with the subject matter of one or any combination of Aspects 1 through 7 to optionally include or use wherein the second air intake is included in a plurality of air intakes, and the plurality of air intakes extend through the side wall of the burn pot.

Aspect 9 may include or use, or may optionally be combined with the subject matter of one or any combination of Aspects 1 through 8 to optionally include or use wherein: the side wall has a first end and a second end, the first end of the side wall is coupled to the bottom wall, and the second air intake is located proximate to the second end of the second combustion chamber wall.

Aspect 10 may include or use, or may optionally be combined with the subject matter of one or any combination of Aspects 1 through 9 to optionally include or use a first temperature sensor configured to measure an air temperature proximate to the apparatus.

Aspect 11 may include or use, or may optionally be combined with the subject matter of Aspect 10 to optionally include or use wherein the first temperature sensor is located in the air box.

Aspect 12 may include or use, or may optionally be combined with the subject matter of Aspect 10 to optionally include or use a cooking area configured to support at least one food product; and a second temperature sensor located proximate to the cooking area, wherein the second temperature sensor is configured to measure an air temperature proximate to the cooking area.

Aspect 13 may include or use, or may optionally be combined with the subject matter of one or any combination of Aspects 1 through 12 to optionally include or use fan coupled to the air box, wherein operation of the fan is configured to pressurize the air chamber.

Aspect 14 may include or use subject matter (such as an apparatus, a system, a device, a method, a means for performing acts, or a device readable medium including instructions that, when performed by the device, may cause the device to perform acts), such as may include or use a system for cooking food, comprising: a control circuit configured to: transmit a first control signal configured to operate a fuel feeder, wherein the first control signal corresponds to a rate of fuel discharged from the fuel feeder; receive a second control signal corresponding to an amount of fuel discharged from the fuel feeder; transmit a third control signal configured to operate a fan, wherein the third control signal corresponds to a speed of the fan; and receive a fourth control signal corresponding to an amount of air displaced by the fan.

Aspect 15 may include or use, or may optionally be combined with the subject matter of Aspect 14, to optionally include or use wherein the control circuit is further configured to receive a first temperature signal, the first temperature signal indicative of a temperature of the system.

Aspect 16 may include or use, or may optionally be combined with the subject matter of Aspects 15 to optionally include or use wherein the control circuit is further configured to modulate the first control signal, the third control signal, or both of the first control signal and the third control signal based upon the first temperature signal.

Aspect 17 may include or use, or may optionally be combined with the subject matter of one or any combination of Aspects 14 through 16 to optionally include or use a first temperature sensor in communication with the control circuit and configured to: measure a cooking temperature proximate to a cooking area, and provide a first temperature signal indicative of the cooking temperature.

Aspect 18 may include or use, or may optionally be combined with the subject matter of one or any combination of Aspects 14 through 17 to optionally include or use wherein the control circuit is further configured to determine an air-to-fuel ratio, the air-to-fuel ratio including the amount of air displaced by the fan compared to the amount of fuel discharged from the fuel feeder.

Aspect 19 may include or use, or may optionally be combined with the subject matter of Aspect 18 to optionally include or use wherein the control circuit is further configured to modulate the first control signal, the third control signal, or both of the first control signal and the third control signal to adjust the air-to-fuel ratio.

Aspect 20 may include or use, or may optionally be combined with the subject matter of Aspect 19 to optionally include or use wherein the control circuit is further configured to maintain the air-to-fuel ratio within an air-to-fuel threshold.

Aspect 21 may include or use, or may optionally be combined with the subject matter of Aspect 20 to optionally include or use wherein the air-to-fuel threshold is user-selectable.

Aspect 22 may include or use, or may optionally be combined with the subject matter of one or any combination of Aspects 18 through 21 to optionally include or use a network communication interface in communication with the control circuit, wherein the network communication interface is configured to: receive the determined air-to-fuel ratio; and transmit the determined air-to-fuel ratio.

Aspect 23 may include or use, or may optionally be combined with the subject matter of one or any combination of Aspects 14 through 22 to optionally include or use wherein the first control signal, the third control signal, or both of the first control signal and the third control signal are direct current electrical signals.

Aspect 24 may include or use, or may optionally be combined with the subject matter of Aspect 23 to optionally include or use wherein the second control signal or the fourth control signal are direct current electrical signals.

Aspect 25 may include or use, or may optionally be combined with the subject matter of one or any combination of Aspects 14 through 24 to optionally include or use a network communication interface, wherein the network communication interface is configured to receive at least one of the first control signal, the second control signal, the third control signal, or the fourth control signal.

Aspect 26 may include or use, or may optionally be combined with the subject matter of one or any combination of Aspects 14 through 25 to optionally include or use a network communication interface wherein the network communication interface is further configured to transmit at least one of the first control signal, the second control signal, the third control signal, or the fourth control signal.

Aspect 27 may include or use, or may optionally be combined with the subject matter of one or any combination of Aspects 14 through 26 to optionally include or use a network communication interface, wherein the control circuit is at least partially controlled via the network communication interface.

Aspect 28 may include or use, or may optionally be combined with the subject matter of Aspect 27 to optionally include or use a user terminal in communication with the network communication interface, wherein user engagement with the user terminal directs at least one function of the control circuit.

Aspect 29 may include or use, or may optionally be combined with the subject matter of one or any combination of Aspects 14 through 28 to optionally include or use the fuel feeder and the fan.

Aspect 30 may include or use, or may optionally be combined with the subject matter of one or any combination of Aspects 14 through 29 to optionally include or use a cooking apparatus configured to support at least one food product within a cooking area of the cooking apparatus.

Aspect 31 may include or use subject matter (such as an apparatus, a system, a device, a method, a means for performing acts, or a device readable medium including instructions that, when performed by the device, may cause the device to perform acts), such as may include or use a method for controlling a cooking apparatus, comprising: monitoring a temperature of a cooking area of the cooking apparatus; adjusting an amount of fuel discharged from a fuel feeder from a first fuel feed rate to a second fuel feed rate, wherein the fuel is combusted in a combustion chamber of the apparatus; and adjusting a speed of a fan from a first fan speed to a second fan speed, wherein adjusting the speed of the fan varies an amount of air displaced by the fan and the speed of the fan is adjusted to establish a desired air-to-fuel ratio for the combustion in the combustion chamber.

Aspect 32 may include or use, or may optionally be combined with the subject matter of Aspect 31, to optionally include or use adjusting the amount of fuel discharged from the fuel feeder from the second fuel feed rate to a third fuel feed rate.

Aspect 33 may include or use, or may optionally be combined with the subject matter of one or any combination of Aspects 31 or 32 to optionally include or use adjusting the speed of the fan from the second fan speed to a third fan speed.

Aspect 34 may include or use, or may optionally be combined with the subject matter of one or any combination of Aspects 31 through 33 to optionally include or use maintaining the desired air-to-fuel ratio by adjusting the speed of the fan, adjusting the amount of fuel discharged from the fuel feeder, or adjusting both of the speed of the fan and adjusting the amount of fuel discharged from the fuel feeder.

Aspect 34 may include or use, or may optionally be combined with any portion or combination of any portions of any one or more of Aspects 1 through 33 to include or use, subject matter that may include means for performing any one or more of the functions of Aspects 1 through 33, or a machine-readable medium including instructions that, when performed by a machine, cause the machine to perform any one or more of the functions of Aspects 1 through 33.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated or clearly required by the context. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An apparatus for cooking a food product, comprising:
   a combustion chamber configured to burn a fuel source, the combustion chamber including:
     a burn pot defined by a side wall and a bottom wall, wherein the bottom wall is coupled to the side wall;
     a manifold wall configured to enclose at least a portion of the side wall, wherein the manifold wall is spaced apart from the side wall forming a manifold chamber therebetween;
     a manifold cover extending between the side wall and the manifold wall, at least one of a top edge of the side wall or an inner diameter of the manifold cover forming an exhaust opening of the burn pot;
     a plurality of first air intakes extending through the bottom wall; and
     a plurality of second air intakes extending through the side wall proximate the exhaust opening;
     wherein the manifold chamber is in communication with the plurality of second air intakes; and
     wherein between the bottom wall and the plurality of second air intakes proximate the exhaust opening, there is an absence of air intakes in the side wall;
   an air box coupled to the combustion chamber, the air box defining an air chamber, wherein the air chamber is in communication with at least the manifold chamber;
   a fan in communication with the air box, wherein the fan, air box, size and shape of the manifold chamber, and the absence of air intakes in the side wall between the bottom wall and the plurality of second air intakes proximate the exhaust opening are configured to pressurize and preheat air between the side wall and manifold wall prior to the air entering the plurality of second air intakes extending through the side wall proximate the exhaust opening;
   a control circuit configured to:
     transmit a first control signal configured to operate a fuel feeder, wherein the first control signal corresponds to a rate of fuel discharged from the fuel feeder toward the combustion chamber;
     transmit a second control signal configured to operate the fan, wherein the second control signal corresponds to a speed of the fan;
     receive a third control signal corresponding to an amount of fuel discharged from the fuel feeder;
     receive a fourth control signal corresponding to an amount of air displaced by the fan;
     determine an air-to-fuel ratio based on the third and fourth control signals, the air-to-fuel ratio indicative of the amount of air displaced by the fan compared to the amount of fuel discharged from the fuel feeder; and
     modulate the first control signal, the second control signal, or both of the first control signal and the second control signal based at least in part upon the determined air-to-fuel ratio; and
   a network communication interface in communication with the control circuit and configured to receive at least one of the first control signal, the second control signal, the third control signal, or the fourth control signal.

2. The apparatus of claim 1, wherein the manifold wall defines an intake recess located at the interface between the manifold chamber and the air chamber.

3. The apparatus of claim 1, wherein the control circuit is further configured to receive a first temperature signal, the first temperature signal indicative of a temperature of the apparatus.

4. The apparatus of claim 3, wherein the control circuit is further configured to modulate the first control signal, the second control signal, or both of the first control signal and the second control signal based at least in part upon the first temperature signal.

5. The apparatus of claim 3, further comprising:
   a first temperature sensor in communication with the control circuit and configured to:
     measure a cooking temperature proximate to a cooking area heated by the combustion chamber, and
     provide the first temperature signal.

6. The apparatus of claim 1, wherein the network communication interface is further configured to at least one of:
   receive the determined air-to-fuel ratio; or
   transmit the determined air-to-fuel ratio.

7. The apparatus of claim 1, wherein the first control signal, the second control signal, or both of the first control signal and the second control signal are direct current electrical signals.

8. The apparatus of claim 1, wherein the air-to-fuel ratio comprises a comparison of the fourth signal to the third signal.

9. The apparatus of claim 1, further comprising a cooking area configured to support at least one food product, the cooking area heated by the combustion chamber.

10. The apparatus of claim 1, wherein at least one of the plurality of second air intakes comprises a central axis that is non-perpendicular to the side wall.

11. The apparatus of claim 1, wherein at least the plurality of first air intakes or the plurality of second air intakes are arranged uniformly.

12. The apparatus of claim 1, wherein at least the plurality of first air intakes or the plurality of second air intakes are arranged non-uniformly.

13. An apparatus for cooking a food product, comprising:
a combustion chamber configured to burn a fuel source and comprising:
a burn pot defined by a side wall and a bottom wall and defining a space within the side wall for primary combustion of the fuel source and a space within the side wall, above the space for primary combustion, for secondary combustion of exhaust created by the primary combustion;
a manifold wall configured to enclose at least a portion of the side wall, wherein the manifold wall is spaced apart from the side wall forming a manifold chamber therebetween;
a plurality of first air intakes extending through the bottom wall; and
a plurality of second air intakes extending through the side wall proximate the space for the secondary combustion of exhaust;
an air box coupled to the combustion chamber, the air box defining an air chamber, wherein the air chamber is in communication with at least the manifold chamber;
a fan in communication with the air box, wherein the fan, air box, and size and shape of the manifold chamber are configured to pressurize and preheat air between the side wall and manifold wall prior to the air entering the plurality of second air intakes and into the space for the secondary combustion;
a control circuit configured to:
transmit a first control signal configured to operate a fuel feeder, wherein the first control signal corresponds to a rate of fuel discharged from the fuel feeder toward the combustion chamber;
transmit a second control signal configured to operate the fan, wherein the second control signal corresponds to a speed of the fan;
receive a first temperature signal, the first temperature signal indicative of a temperature of the apparatus;
receive a third control signal corresponding to an amount of fuel discharged from the fuel feeder;
receive a fourth control signal corresponding to an amount of air displaced by the fan;
determine an air-to-fuel ratio based on the third and fourth control signals, the air-to-fuel ratio indicative of the amount of air displaced by the fan compared to the amount of fuel discharged from the fuel feeder; and
modulate the first control signal, the second control signal, or both of the first control signal and the second control signal based at least in part upon the first temperature signal and the determined air-to-fuel ratio; and
a network communication interface in communication with the control circuit and configured to receive at least one of the first control signal, the second control signal, the third control signal, or the fourth control signal.

14. The apparatus of claim 13, wherein between the bottom wall and the plurality of second air intakes, there is an absence of air intakes in the side wall.

15. The apparatus of claim 13, wherein at least one of the plurality of second air intakes comprises a central axis that is non-perpendicular to the side wall.

16. The apparatus of claim 1, wherein the first control signal, the second control signal, or both of the first control signal and the second control signal are modulated to generate an air-to-fuel ratio corresponding to blue smoke.

17. An apparatus for cooking a food product, comprising:
a combustion chamber configured to burn a fuel source, the combustion chamber including:
a burn pot defined by a side wall and a bottom wall, wherein the bottom wall is coupled to the side wall;
a manifold wall configured to enclose at least a portion of the side wall, wherein the manifold wall is spaced apart from the side wall forming a manifold chamber therebetween;
a manifold cover extending between the side wall and the manifold wall, at least one of a top edge of the side wall or an inner diameter of the manifold cover forming an exhaust opening of the burn pot;
a plurality of first air intakes extending through the bottom wall; and
a plurality of second air intakes extending through the side wall proximate the exhaust opening;
wherein the manifold chamber is in communication with the plurality of second air intakes; and
wherein between the bottom wall and the plurality of second air intakes proximate the exhaust opening, there is an absence of air intakes in the side wall;
an air box coupled to the combustion chamber, the air box defining an air chamber, wherein the air chamber is in communication with at least the manifold chamber;
a fan in communication with the air box, wherein the fan, air box, size and shape of the manifold chamber, and the absence of air intakes in the side wall between the bottom wall and the plurality of second air intakes proximate the exhaust opening are configured to pressurize and preheat air between the side wall and manifold wall prior to the air entering the plurality of second air intakes extending through the side wall proximate the exhaust opening;
a control circuit configured to:
transmit a fuel feeder control signal corresponding to a first control signal, the fuel feeder control signal configured to operate a fuel feeder, wherein the fuel feeder control signal corresponds to a rate of fuel discharged from the fuel feeder toward the combustion chamber;
transmit a fan control signal corresponding to a second control signal, the fan control signal configured to operate the fan, wherein the fan control signal corresponds to a speed of the fan;
receive a third control signal corresponding to an amount of fuel discharged from the fuel feeder;
receive a fourth control signal corresponding to an amount of air displaced by the fan;
determine an air-to-fuel ratio based on the third and fourth control signals, the air-to-fuel ratio indicative of the amount of air displaced by the fan compared to the amount of fuel discharged from the fuel feeder; and modulate the fuel feeder control signal, the fan control signal, or both of the fuel feeder control signal and the fan control signal based at least in part upon the determined air-to-fuel ratio; and a network communication interface in communication with the control circuit and configured to receive at least one of the first control signal, the second control signal, the third control signal, or the fourth control signal.

18. The apparatus of claim 17, wherein the control circuit is further configured to receive a first temperature signal, the first temperature signal indicative of a temperature of the apparatus.

19. The apparatus of claim 18, further comprising a cooking area configured to support at least one food product, the cooking area heated by the combustion chamber.

20. The apparatus of claim 19, wherein the first control signal, the second control signal, or both of the first control signal and the second control signal are modulated to generate an air-to-fuel ratio corresponding to blue smoke.

* * * * *

UNITED STATES PATENT AND TRADEMARK OFFICE
CERTIFICATE OF CORRECTION

PATENT NO. : 11,045,048 B2
APPLICATION NO. : 16/407534
DATED : June 29, 2021
INVENTOR(S) : Diekmann et al.

It is certified that error appears in the above-identified patent and that said Letters Patent is hereby corrected as shown below:

On the Title Page

In item (73), in "Assignee", in Column 1, Line 1, delete "Daisin" and insert --Dalsin-- therefor In item (73), in "Assignee", in Column 1, Line 1, delete "inc.," and insert --Inc.,-- therefor Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*